Patented July 30, 1940

2,209,683

UNITED STATES PATENT OFFICE 2,209,683

HALOGENATION OF DIKETENE

Albert B. Boese, Jr., Pittsburgh, Pa., assignor to Carbide and Carbon Chemicals Corporation, a corporation of New York No Drawing. Application June 27, 1936,
Serial No. 87,669

16 Claims. (Cl. 260—586)

This invention relates to the halogenation of diketene, and to the production of halogenated derivatives of diketene. It has especial utility in the production of chlorinated diketene derivatives.

According to the invention diketene is reacted with an anhydrous halogen in the cold to form a gamma haloacetoacetyl halide, as shown in the following equation, in which X designates a halogen atom:

$$CH_3COCH=C=O+X_2 \rightarrow XCH_2COCH_2COX$$

The resultant haloacetoacetyl halide may be isolated from the reaction mixture in impure form; or the reaction mixture containing the haloacetoacetyl halide may be reacted with an appropriate reagent to partially dehalogenate the said halide and convert it to the corresponding mono halogenated acetone, mono halogenated acetoacetamide, or gamma halogenated acetoacetic ester.

The halogenation preferably is conducted at a temperature of around 10° C. or below, to facilitate control of the reaction and prevent or inhibit side reactions interfering with the course of the halogenation, such as would result in loss of the diketene. Temperatures within the range from 0° to 10° C. have been found most satisfactory for the halogenation.

The reaction may be conducted in the presence of a low-boiling solvent for the diketene which is inert to the reactants under the conditions of use, such as carbon tetrachloride, ethylene dichloride, propylene dichloride, and carbon disulfide. In certain instances, particularly where the halogenated products subsequently are hydrolyzed for the production of the mono halogenated acetones, it is desirable to conduct the halogenation in the absence of such a solvent, since the presence of the latter apparently interferes with the hydrolysis; and often it is difficult to separate completely from the halogenated acetones produced. On the other hand, the bromination of diketene preferably is conducted in the presence of an inert solvent to temper and control the reaction which otherwise may be violent.

The following examples will serve to illustrate the invention, although it will be understood that the latter is in no sense limited to the specific procedures or reactions recited:

Example I

Dry chlorine gas was passed at atmospheric pressure into a body of 25 grams of diketene, maintained at a temperature of from 0° to 10° C., until 21 grams of chlorine had been absorbed. The chlorinated product then was poured into 150 c. c. of cold water, and the reaction mixture was heated under reflux for two hours, and then was allowed to cool to room temperature overnight. Carbon dioxide was evolved; and monochloracetone separated from the solution. The reaction mixture was extracted three times with ether, the ether extract was dried over calcium chloride, and the ether was distilled from the mixture. The residue was fractionally distilled under atmospheric pressure, yielding 19.1 grams of monochloracetone, boiling at from 117° to 121° C. under the said pressure, corresponding to a yield of about 70%. The following equation represents the reactions involved:

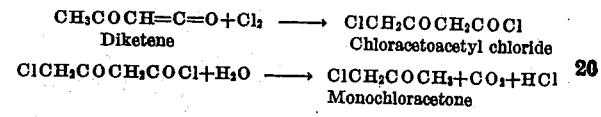

$$CH_3COCH=C=O+Cl_2 \longrightarrow ClCH_2COCH_2COCl$$
$$\text{Diketene} \qquad\qquad\qquad \text{Chloracetoacetyl chloride}$$

$$ClCH_2COCH_2COCl+H_2O \longrightarrow ClCH_2COCH_3+CO_2+HCl$$
$$\text{Monochloracetone}$$

Example II

To 25 grams of diketene in 100 c. c. of carbon tetrachloride, there were added slowly with agitation and cooling 46 grams of bromine in 100 c. c. of carbon tetrachloride. The resultant reaction was exothermic. During the bromine addition the temperature of the mixture was maintained between 0° and 10° C. Most of the solvent then was removed by distillation under atmospheric pressure; and the remaining solution was poured into 150 c. c. of water. The resultant mixture stood at room temperature for two hours, and then was heated on a water bath for two hours. Carbon dioxide was evolved during the resultant hydrolysis. Upon cooling the mixture to room temperature, it separated into layers,—the carbon tetrachloride layer being drawn off. The aqueous layer was almost neutralized by the addition of 13 grams of sodium carbonate, and was then extracted twice with carbon tetrachloride. These extracts were combined, dried over $CaCl_2$, the solvent distilled off, and the residue fractionated under atmospheric pressure. There were obtained 28.2 grams of monobromacetone, $BrCH_2COCH_3$, boiling at between 125° and 130° C. under atmospheric pressure, corresponding to a yield of 69%.

Example III

Through a solution of 8.4 grams of diketene in 50 c. c. of carbon tetrachloride was passed a stream of dry chlorine until 7 grams thereof had been absorbed, while maintaining the solution at a temperature between 0° and 10° C. by cooling the reaction vessel in an acetone-dry ice bath. The cold solution then was slowly added to a solution of 10 grams of dry ethanol in 25 c. c. of carbon tetrachloride. A vigorous exothermic reaction occurred, and hydrogen chloride was liberated. The resultant solution was washed several times with water to remove hydrogen chloride, and was dried over calcium chloride. The solvent was distilled off, after which the residue was fractionally distilled in vacuum, yielding 12 grams of gamma chlorethyl acetoacetate as a liquid, insoluble in water but soluble in all of the common organic solvents, and which boils at between 124° and 126° C. under an absolute pressure of 27 mm. of mercury, corresponding to a yield of around 73%. The chloracetoacetyl chloride produced by the chlorination evidently reacted with the dry ethanol to form the ethyl gamma-chlor acetoacetate, $ClCH_2COCH_2COOC_2H_5$.

Example IV

Through a solution of 10 grams of diketene in 20 c. c. of carbon tetrachloride, dry chlorine was passed until 8.5 grams thereof had been absorbed, while maintaining the solution at a temperature between 0° and 10° C. The resulting solution of chloracetoacetyl chloride was added to a solution of 11 grams of phenol in 60 c. c. of carbon tetrachloride. A moderately exothermic reaction occurred, and hydrogen chloride was evolved. The solvent and most of the hydrogen chloride was removed by heating the solution under vacuum on a boiling water bath. The residue was extracted with ether, the ether solution was washed several times with water, and was dried with anhydrous sodium sulfate. The ether then was distilled off, and the residue was fractionally distilled under vacuum. There thus were obtained 22 grams of phenyl gamma-chlor acetoacetate, $ClCH_2COCH_2COOC_6H_5$, a liquid which is insoluble in water but is soluble in all of the common organic solvents, and which boils at from 134° to 136° C. under an absolute pressure of 8 mm. of mercury,—corresponding to a yield of around 87%. When freshly distilled the liquid was colorless, but on standing it developed acidity and darkened in color.

Example V

Twenty grams of diketene (melting point, −13° C.) was dissolved in 60 c. c. of dry carbon tetrachloride, and the solution was cooled to −5° C. by means of a dry ice-acetone bath. Dry chlorine gas was passed into the solution until 15 grams thereof had been absorbed, during which time the temperature was not allowed to rise above 5° C. To the solution then was added 100 c. c. of carbon tetrachloride, and then was slowly added a solution of 20 grams of aniline in 50 c. c. of the same solvent. A pale yellow crystalline precipitate of crude gamma chloracetoacetanilide formed. It was separated on a filter, washed with water, and dried. There was obtained 35 grams of the crude amide, which was recrystallized from dilute methanol, yielding almost colorless crystals which melt at between 136° and 138° C. Gamma chloracetoacetanilide is soluble in alcohols, ketones, esters, and aromatic hydrocarbons. It is insoluble in water, chlorinated hydrocarbons, and aliphatic hydrocarbons.

The following equation illustrates the reaction:

$$CH_3COCH=C=O + Cl_2 \rightarrow ClCH_2COCH_2COCl$$
Diketene    Chloracetoacetyl chloride $$ClCH_2COCH_2COCl + H_2NC_6H_5 \rightarrow$$
$$ClCH_2COCH_2CONHC_6H_5 + HCl$$

It is within the scope of the present invention to substitute for the specific alcohol, phenol, and amine named herein with which to react the haloacetoacetyl halide, other aliphatic alcohols, such as isopropyl alcohol, secondary heptadecyl alcohol, tertiary amyl alcohol, ethyl hexyl alcohol; other monohydric and polyhydric phenols; other aliphatic and aromatic amines; and ammonia; for the resultant production of corresponding halogenated acetoacetates and acetoacetamides.

The halogenated derivatives of diketene produced in accordance with this invention are valuable intermediates for the production of a wide variety of compounds, including quinoline derivatives having properties adapting them as bactericides.

Monochloracetone is useful in the production of stovaine, a well known local anaesthetic; and in the manufacture of acetonylacetone.

An important advantage in the preparation of the monohalogenated acetones by this process resides in the fact that no di- or poly-halogenated products are formed, thereby favoring the production of a pure product in high yields.

The invention is susceptible of modification within the scope of the appended claims.

What is claimed is:

1. In the process for producing a monohalogenated acetone from diketene, the steps which comprise hydrolyzing a monohalogenated acetoacetyl halide formed by the halogenation of diketene, and recovering from the resultant reaction mixture the monohalogenated acetone thus produced.

2. Process which comprises halogenating diketene under conditions producing a monohalogenated acetoacetyl halide, hydrolyzing the latter, and recovering the monohalogenated acetone thus produced.

3. Process which comprises chlorinating diketene under conditions producing a monochloracetoacetyl chloride, hydrolyzing the latter, and recovering the monochloracetone thus produced.

4. Process which comprises halogenating diketene in the cold, and hydrolizing the resultant haloacetoacetyl halide.

5. Process which comprises halogenating diketene in the cold, reacting the resulting halogenated product with water, and recovering the monohalogenated acetone thus produced.

6. Process which comprises halogenating diketene in the cold in the presence of a low-boiling inert diketene solvent, and hydrolizing the haloacetoacetyl halide thus produced.

7. Process which comprises halogenating diketene in the cold in the presence of an inert solvent for the reactants, thereby forming a halogenated acetoacetyl halide, stripping from the reaction mixture at least the major portion of the said solvent, thereafter hydrolyzing the said halide present in the stripped mixture, and recovering the monohalogenated acetone thus produced.

8. Process which comprises reacting diketene and a dry halogen, while maintaining the reaction mixture at a temperature not substantially higher than 10° C.

9. Process which comprises halogenating diketene at a temperature not substantially above 10 C., hydrolizing the resultant haloacetoacetyl halide, and recovering the monohalogenated acetone thus produced.

10. Process which comprises chlorinating diketene at a temperature not substantially above 10° C., treating the resultant reaction mixture with water, and recovering the monochloracetone thus produced.

11. Process which comprises reacting diketene and dry chlorine, while maintaining the reaction mixture at a temperature not substantially higher than 10° C.

12. Process which comprises contacting a stream of dry chlorine with a body of diketene, while maintaining the resultant mixture at a temperature not substantially above 10° C., hydrolyzing the resultant chloracetoacetyl chloride, and recovering the monochloracetone thus produced.

13. Process as defined in claim 12, wherein the said body of diketene is in solution in an inert solvent for diketene.

14. Process which comprises halogenating diketene at a temperature not substantially above 10° C. in the presence of a low-boiling inert diketene solvent, hydrolizing the resultant haloacetoacetyl halide, and recovering the monohalogenated acetone thus produced.

15. Process which comprises reacting diketene and a dry halogen at a temperature not substantially above 10° C., in the presence of a dry low-boiling diketene solvent which is inert to the reactants, partially dehalogenating the resultant halogenated acetoacetyl halide, and recovering from the resultant reaction mixture the monohalogenated acetoacetyl compound thus produced.

16. Process which comprises reacting diketene and a dry halogen in the presence of a dry low-boiling diketene solvent which is inert to the reactants, while maintaining the solution at a temperature not substantially above 10° C., hydrolyzing the resultant halogenated acetoacetyl halide, and recovering from the reaction mixture the monohalogenated acetone thus produced.

ALBERT B. BOESE, Jr.